US007735586B2

(12) United States Patent
Hämmerl

(10) Patent No.: US 7,735,586 B2
(45) Date of Patent: Jun. 15, 2010

(54) INDUSTRIAL TRUCK

(75) Inventor: Robert Hämmerl, Hohenthann (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 356 days.

(21) Appl. No.: 11/730,932

(22) Filed: Apr. 4, 2007

(65) Prior Publication Data

US 2007/0247327 A1 Oct. 25, 2007

(30) Foreign Application Priority Data

Apr. 4, 2006 (DE) ....................... 10 2006 015 772

(51) Int. Cl.
*B62D 11/00* (2006.01)
*B62D 51/04* (2006.01)
*B66F 9/06* (2006.01)

(52) U.S. Cl. .................... 180/19.1; 180/6.48; 180/19.3; 187/222

(58) Field of Classification Search ................ 180/19.1, 180/19.2, 19.3, 6.48, 6.5, 305; 187/222
See application file for complete search history.

(56) References Cited

U.S. PATENT DOCUMENTS 3,016,973 A 1/1962 Williamson
6,662,888 B2 * 12/2003 Bettella ..................... 180/19.1

FOREIGN PATENT DOCUMENTS

| | | | |
|---|---|---|---|
| DE | 87 00 166.7 | U1 | 3/1988 |
| DE | 102006008034 | A1 | 8/2007 |
| EP | 0905083 | A1 | 3/1999 |
| JP | 2000247598 | A1 | 9/2000 |

OTHER PUBLICATIONS

"Fernsteuerung spat Helfer", In Fördermitteljournal 1-2, 1993, p. 45.
Mechanical Handling, Dec. 1968, p. 1813.

* cited by examiner

*Primary Examiner*—Lesley Morris
*Assistant Examiner*—Marc A Scharich
(74) *Attorney, Agent, or Firm*—Rothwell, Figg, Ernst & Manbeck, P.C.

(57) ABSTRACT

An industrial truck and a method for its delivery are proposed, the mobile base of the industrial truck being transported to the delivery destination on a load transport vehicle. At the delivery destination, an operating device that is also supplied is used as a mobile operating device for issuing control instructions for the traction operations of the base vehicle, in order to drive the base vehicle with its own drive units off the load transport vehicle over a ramp or the like and thus to set it down.

3 Claims, 1 Drawing Sheet

INDUSTRIAL TRUCK

BACKGROUND OF THE INVENTION

The invention relates to an industrial truck, in particular a stacker vehicle, for the movement and handling of loads, having a mobile base, a driver's station for the operator, a load handling device and an electric control device for controlling the traction operation and/or the load handling operation of the industrial truck, the control device having an operating device which is normally installed in the driver's station and by means of which the operator can issue control instructions.

Industrial trucks of the type mentioned above are in use in many designs, for example as high-bay order picking stackers. High-bay order picking stackers can be constructed, for example, as electric order picking/three-sided stackers which, on the mobile base, have a telescopic lifting frame and, adjustable vertically on the latter, the driver's station. Provided on the driver's station, as a load handling device, are a lateral thrust device having an additional lifting mast and a fork carrier that is adjustable vertically on the latter and has loadbearing forks. The additional lifting mast can be rotated about a vertical axis, so that the load carrying forks can be oriented in the straight-ahead direction of travel or transversely with respect thereto. The lateral thrust device is able to displace the additional lifting mast and the load carrying forks laterally, for example to pick up a pallet or the like from a high-bay rack. In the driver's station of such a high-bay stacker, an operating desk having an operating console is usually provided as an operating device and, for example, has a steering wheel, control switches for diverse operating functions of the high-bay stacker and at least one display.

High-bay stackers are in use in which the telescopic lifting frame has a height of 6-7 m when retracted and can be extended to a height of 12-13 m.

Because of these large dimensions, such high-bay stacker vehicles are normally transported from the manufacturer to the customer in the not yet completely assembled state. In this case, the lifting mast is normally transported as a transport unit lying on a load transport vehicle. Further transport units are the base vehicle with drive units, the driver's station and subassemblies of the load handling device. At the customer, the industrial truck is then put together from the transport units and commissioned as intended. In the usual way, a loading crane is required on site at the customer in order to unload the base vehicle and the further transport units from the load transport vehicle and to bring the lifting frame into the vertical mounting position, which frame can then be installed on the base vehicle. The unloading and mounting operation for the commissioning of the industrial truck delivered is therefore not without effort.

BRIEF SUMMARY OF THE INVENTION

The invention is based on the object of providing an industrial truck of the type mentioned at the beginning which, during loading and unloading for delivery purposes, is comparatively simple to handle in the partly disassembled transport state.

In order to achieve this object, the invention proposes that the control device has an interface for producing a communications link with a mobile operating device which can be operated outside the driver's station as required and by means of which an operator can issue control instructions.

The mobile operating device can be used, for example, in order to control the mobile base, still separated from other transport units, such as the driver's station, the lifting frame and the load handling device, so that the said base can execute controlled traction movements with its own drive units. This can be used when loading the mobile base, also designated the base vehicle, in order to drive it with its own drive means over a ramp or the like onto the load transport vehicle provided for its transport in the transport position. Crane operations, which are complicated and risky on account of the high weight of the base vehicle, when loading the base vehicle onto the transport vehicle and when setting the base vehicle down from the transport vehicle can thus be avoided in most cases, which makes the loading operation not only more flexible and possibly safer but also less expensive.

In a particularly preferred refinement of the invention, the operating device normally installed in the driver's station can be removed if necessary and used as a mobile operating device for issuing control instructions via the interface. For the loading operation, this means that the operating console, preferably also supplied at the same time as an individual transport unit, can be used as a mobile operating device for maneuvering the base vehicle. Thus, neither the fitting of the driver's station nor the fitting of the components of the load handling device to the base vehicle is necessary for this purpose.

In the course of the assembly of the industrial truck at the customer, the operating console can then be mounted in the driver's station for the subsequent normal operation. In this case, provision can be made for one and the same interface to be used for this normal installation and for the mobile use of the operating device. In another embodiment of the invention, interfaces which are separate but otherwise similar in design are provided here.

The connection between operating device and interface is preferably made via a connecting cable. However, this is not intended to rule out exemplary embodiments in which the operating device is able to communicate with the control device via a relevant interface by means of a radio connection.

It should be pointed out that the concept of controlling the base vehicle as required by means of a mobile operating device that can be operated outside the driver's station can be applied not only to high-bay stackers of the type mentioned above but also to other industrial trucks, for example to those which are loaded completely ready to operate in order to be transported to the customer. For safety reasons, even in such a case, it can often be practical to carry out the loading operation of the industrial truck under remote control by means of the mobile operating device.

Further situations are also conceivable, for example emergency situations, in which the remotely controlled maneuvering of the industrial truck can be helpful.

A subject of the invention in the sense of the above explanations is also a method for delivering an industrial truck according to one of Patent Claims 1-4 to a delivery destination, the mobile base being transported to the delivery destination on a load transport vehicle, the method being characterized in that the operating device which is also supplied is used as a mobile operating device for issuing control instructions for the traction operation of the mobile base, in order to drive the mobile base with its own drive means onto the load transport vehicle over a ramp or the like during loading operation and/or to drive it off the load transport vehicle at the delivery destination and thus to set it down.

Components of the load handling device, in particular a lifting frame and substantially the complete driver's station, are preferably transported to the delivery destination in the state in which they are not yet mounted on the mobile base and are fitted there to the base set down from the load transport vehicle.

An exemplary embodiment of the invention will be explained in more detail with reference to the figures.

DETAILED DESCRIPTION OF THE INVENTION

Figure 1:
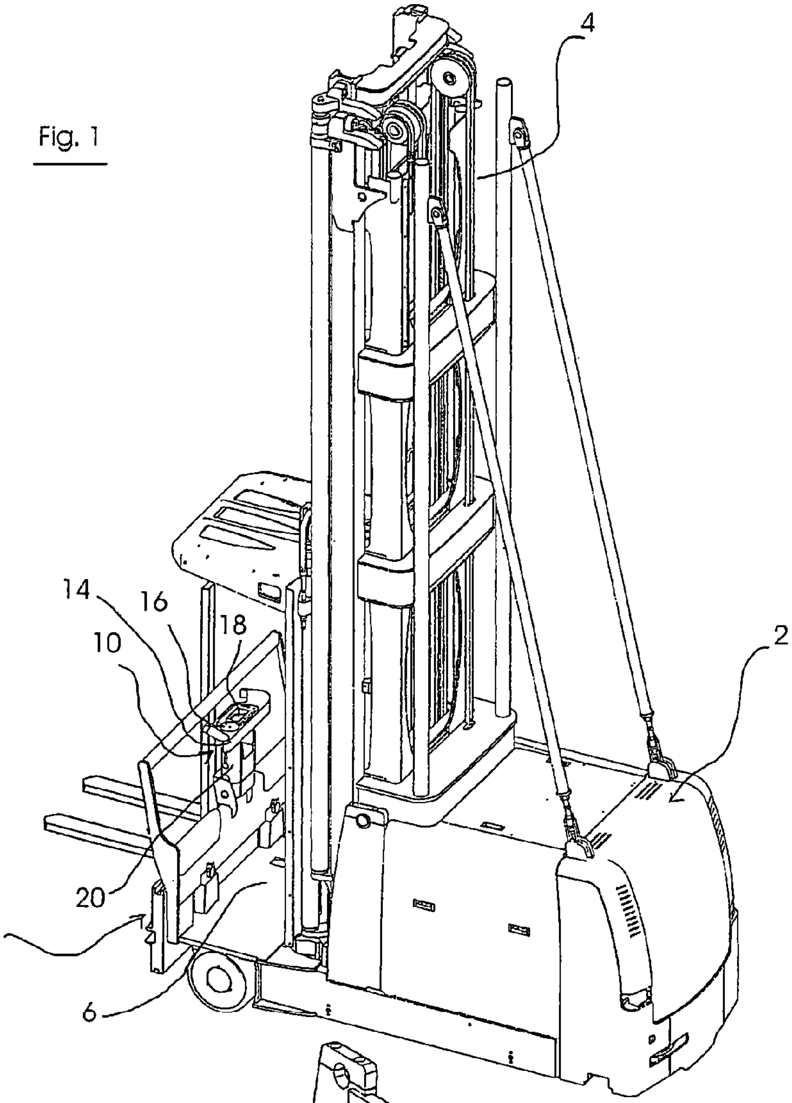
FIG. 1 shows a perspective view of a high-bay order picking stacker according to the invention.

The high-bay stacker according to FIG. 1 is an electric order picking/three-sided stacker comprising a base vehicle 2, a telescopic lifting frame 4 on the base vehicle 2, a driver's station 6 which can be moved vertically on the lifting frame 4 and which, on its front side, as a load handling device, has a lateral thrust device 8 of intrinsically known design. An operator (not shown) located in the driver's station 6 can issue control instructions to a control device 12 (FIG. 2) by means of the operating device 10, in order to control the traction operation, the lifting operation and the further load handling operation of the industrial truck.

The operating device 10 comprises an upper console element 14 having a steering wheel 16, a display 18 and a plurality of control switches or control pushbuttons. The console element 14 is removably fixed to a mounting 20, which permits adjustment of the console element 14 between the position shown in FIG. 1 for operation when standing and in a position pivoted in the direction of the lifting frame 4 and lowered for operation when sitting.

When supplied new, the lifting frame 4, the driver's station 6, components of the lateral thrust device 8 and the base vehicle 2 are transported as respective transport units, preferably on a common load transport vehicle. For the purpose of loading, the base vehicle can be maneuvered under remote control, specifically by means of the drive from its own drive means, at least one electric motor in the example.

Figure 2:
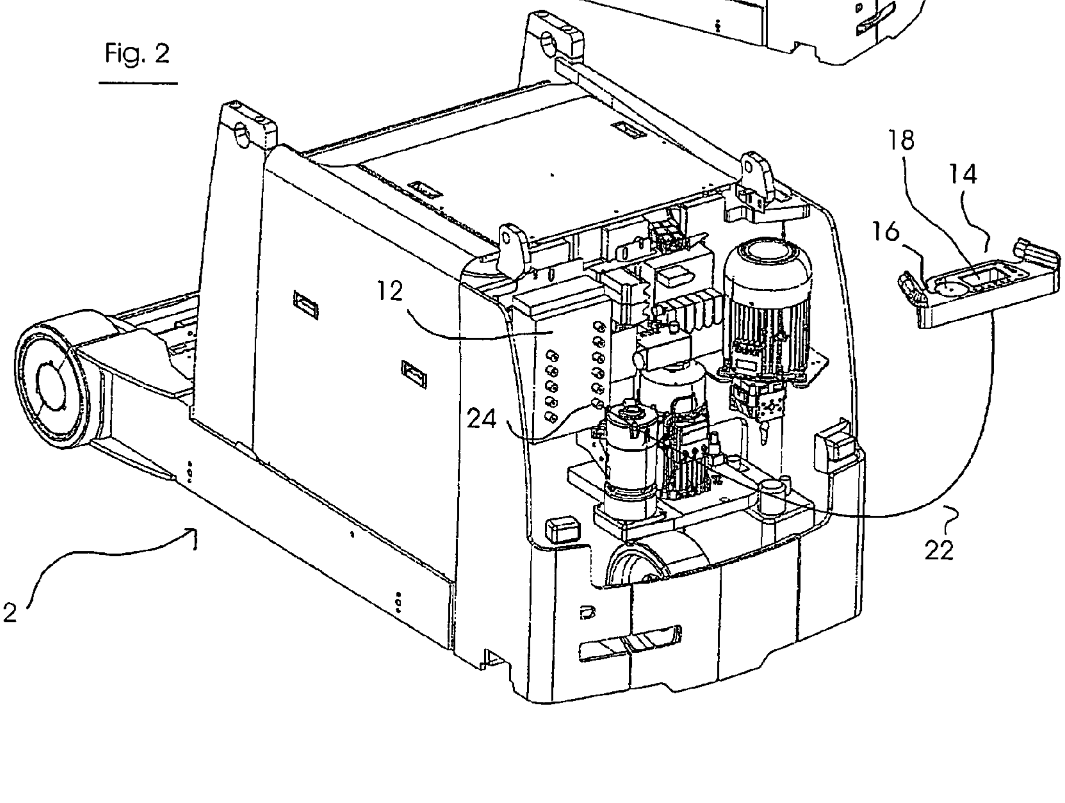
FIG. 2 shows the base vehicle of the high-bay order picking stacker from FIG. 1 in a perspective illustration with the rear hood removed and with a mobile operating device.

As illustrated in FIG. 2, the not yet mounted console 14 can be used as a mobile, portable operating device for controlling the traction operation of the base vehicle 2, being connected to the interface 24 of the control device 12 via a connecting cable 22 in the exemplary embodiment according to FIG. 2.

The base vehicle 2 equipped with all the operating components for the traction operation contains a large number of further components prepared ready to operate, for example, the lifting and load handling device 4, 6, 8 which have yet to be fitted for the hydraulic lifting operation and load handling operation.

The operating console 14 is finally mounted in the manner shown in FIG. 1 in the front railing region of the driver's station 6 as the industrial truck is assembled and, from that time onward, can be used as an operating device which is stationary but can be removed again if required. Here, it is not intended to rule out the situation in which a substitute operating console element is also carried for the remote control operation as required.

What is claimed is:

1. Industrial truck for the movement and handling of loads, comprising:

a mobile base;

a driver's station disposed on the mobile base for housing an operator;

a load handling device operably mounted on the mobile base;

an operating device;

an electric control device provided on the mobile base for controlling traction operation and/or load handling operation of the industrial truck, said electric control device further comprising an interface configured to communicate with the operating device; and the operating device further comprising a mobile operating element which includes an integral steering wheel disposed thereon, said mobile operating element being removeably installed in the driver's station such that it can be removed and operated remotely outside the driver's station, said mobile operating element configured to issue control commands controlling at least the traction operation of the industrial truck via communication with said interface.

2. Industrial truck according to claim 1, characterized in that the mobile operating element can be connected to the interface via a connecting cable.

3. Industrial truck according to claim 1, characterized in that the mobile operating element is able to communicate with the electric control device via the interface by means of a radio connection.

* * * * *